(12) United States Patent
Sunabashiri

(10) Patent No.: US 7,607,511 B2
(45) Date of Patent: Oct. 27, 2009

(54) VEHICLE PASSENGER-RESTRAINING DEVICE AND METHOD

(75) Inventor: Yukisada Sunabashiri, Machida (JP)

(73) Assignee: Nissan Motor Co., Ltd., Yokohama (JP)

( * ) Notice: Subject to any disclaimer, the term of this patent is extended or adjusted under 35 U.S.C. 154(b) by 322 days.

(21) Appl. No.: 11/481,677

(22) Filed: Jul. 6, 2006

(65) Prior Publication Data

US 2007/0018439 A1 Jan. 25, 2007

(30) Foreign Application Priority Data

Jul. 7, 2005 (JP) .............................. 2005-198657

(51) Int. Cl.
*B60K 28/14* (2006.01)
*B60R 21/207* (2006.01)
*B60N 2/42* (2006.01)

(52) U.S. Cl. .................... 180/282; 180/286; 280/730.1; 280/735; 297/216.13

(58) Field of Classification Search ................ 180/282, 180/286; 280/730.1, 734, 735; 297/216.12, 297/216.13, 216.16, 216.18, 216.19; 701/45
See application file for complete search history.

(56) References Cited

U.S. PATENT DOCUMENTS

| | | | | | |
|---|---|---|---|---|---|
| 3,838,870 | A | * | 10/1974 | Hug | 297/472 |
| 5,125,472 | A | * | 6/1992 | Hara | 180/271 |
| 5,203,600 | A | * | 4/1993 | Watanabe et al. | 296/68.1 |
| 5,738,407 | A | * | 4/1998 | Locke | 297/216.12 |
| 5,782,529 | A | * | 7/1998 | Miller et al. | 297/216.13 |
| 5,788,271 | A | * | 8/1998 | Sotelo | 280/730.1 |
| 5,833,312 | A | * | 11/1998 | Lenz | 297/216.13 |
| 5,902,010 | A | * | 5/1999 | Cuevas | 297/216.13 |
| 5,904,368 | A | * | 5/1999 | Blackburn et al. | 280/735 |
| 5,906,393 | A | * | 5/1999 | Mazur et al. | 280/735 |
| 5,925,084 | A | | 7/1999 | Gotoh et al. | |
| 6,027,138 | A | | 2/2000 | Tanaka et al. | |
| 6,038,495 | A | * | 3/2000 | Schiffmann | 701/1 |
| 6,095,550 | A | * | 8/2000 | O'Loughlin et al. | 280/730.1 |
| 6,149,231 | A | * | 11/2000 | Wustholz | 297/216.12 |
| 6,158,812 | A | * | 12/2000 | Bonke | 297/391 |
| 6,196,576 | B1 | * | 3/2001 | Sutherland et al. | 280/730.1 |
| 6,199,900 | B1 | * | 3/2001 | Zeigler | 280/735 |
| 6,206,416 | B1 | * | 3/2001 | Faigle et al. | 280/735 |
| 6,209,910 | B1 | * | 4/2001 | Nagae | 280/735 |
| 6,213,548 | B1 | * | 4/2001 | Van Wynsberghe et al. | 297/216.12 |
| 6,255,790 | B1 | | 7/2001 | Popp et al. | |
| 6,293,584 | B1 | * | 9/2001 | Levine | 280/735 |
| 6,331,014 | B1 | * | 12/2001 | Breed | 280/730.1 |
| 6,572,137 | B2 | | 6/2003 | Bossecker et al. | |

(Continued)

FOREIGN PATENT DOCUMENTS

CN 1072571 C 10/2001

(Continued)

*Primary Examiner*—Paul N Dickson
*Assistant Examiner*—Laura Freedman
(74) *Attorney, Agent, or Firm*—Global IP Counselors, LLP

(57) ABSTRACT

A vehicle passenger-restraining device has a rollover detection device that detects or predicts a rollover of the vehicle, a front airbag that deploys in front of the passenger when the rollover detection device detects or predicts the rollover of the vehicle, and a pushing device that pushes the passenger forward when the rollover detection device detects or predicts the rollover of the vehicle.

29 Claims, 11 Drawing Sheets

U.S. PATENT DOCUMENTS

| | | |
|---|---|---|
| 6,629,575 B2 * | 10/2003 | Nikolov .................. 180/282 |
| 6,752,454 B2 | 6/2004 | Ruel et al. |
| 6,896,325 B2 * | 5/2005 | Takedomi et al. ........ 297/216.1 |
| 7,031,814 B2 * | 4/2006 | Kawato et al. ................ 701/45 |
| 7,278,682 B2 * | 10/2007 | Friedman et al. ......... 297/216.1 |
| 7,318,601 B2 * | 1/2008 | Sugimoto et al. ........ 280/730.1 |
| 2002/0014760 A1 | 2/2002 | Bossecker et al. |
| 2002/0166710 A1 * | 11/2002 | Breed ..................... 180/282 |
| 2004/0113402 A1 * | 6/2004 | Bossecker et al. ........ 280/730.2 |
| 2006/0001298 A1 * | 1/2006 | Tsuruta et al. .......... 297/216.16 |
| 2007/0185635 A1 | 8/2007 | Mattes et al. |

FOREIGN PATENT DOCUMENTS

| | | |
|---|---|---|
| DE | 19509014 A1 | 9/1996 |
| DE | 19741393 A1 | 3/1998 |
| DE | 19742876 A1 | 3/1999 |
| DE | 19842829 A1 | 3/2000 |
| EP | 1164062 A1 | 12/2001 |
| GB | 2357466 A | 6/2001 |
| JP | H11-342822 A | 12/1999 |
| JP | 2002-37011 A | 2/2002 |
| JP | 2002-079944 A | 3/2002 |
| JP | 2003063342 | 3/2003 |
| JP | 2003-517966 A | 6/2003 |
| JP | 2004-224325 A | 8/2004 |
| WO | WO-2004/103779 A1 | 12/2004 |

* cited by examiner

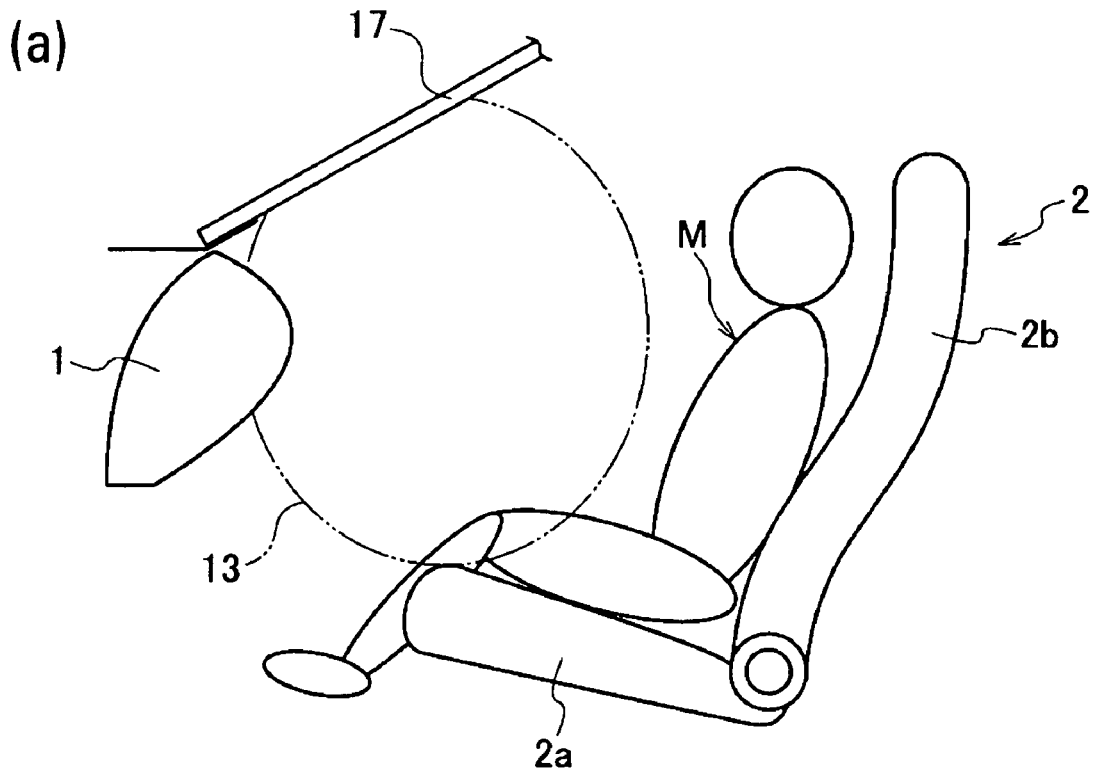
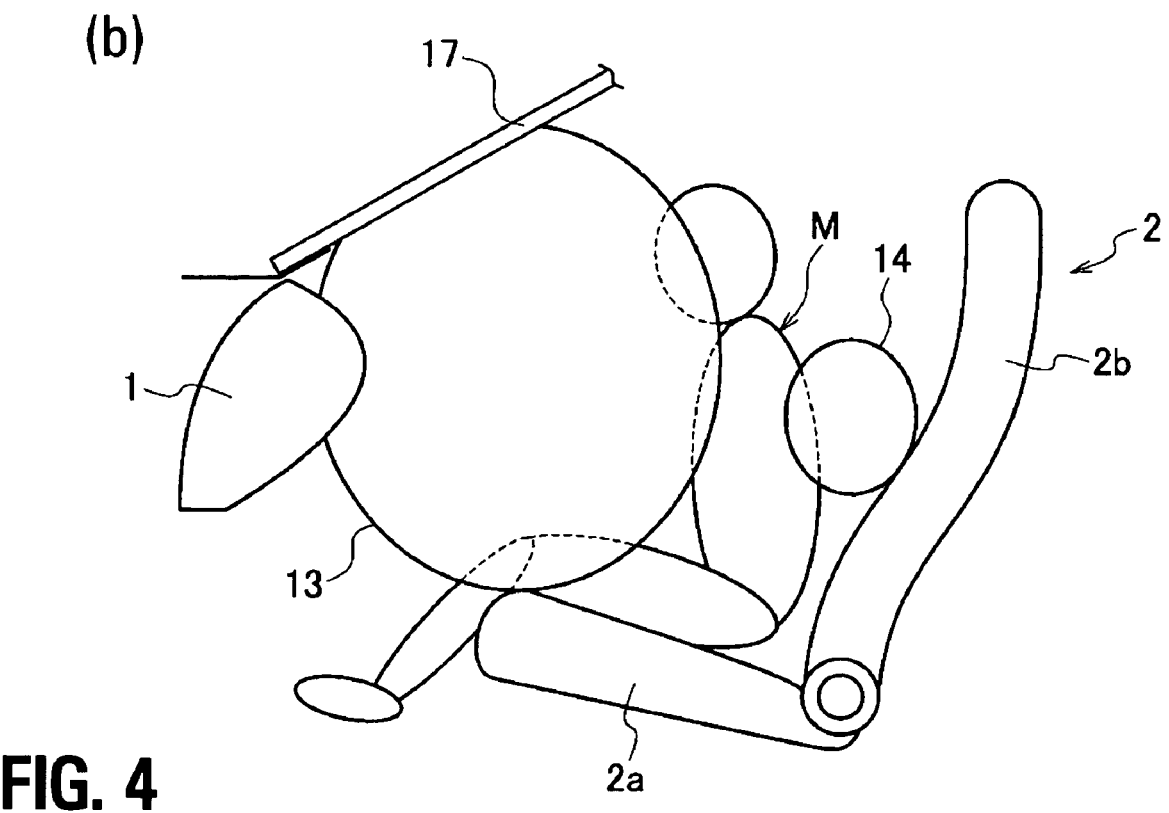
FIG. 4

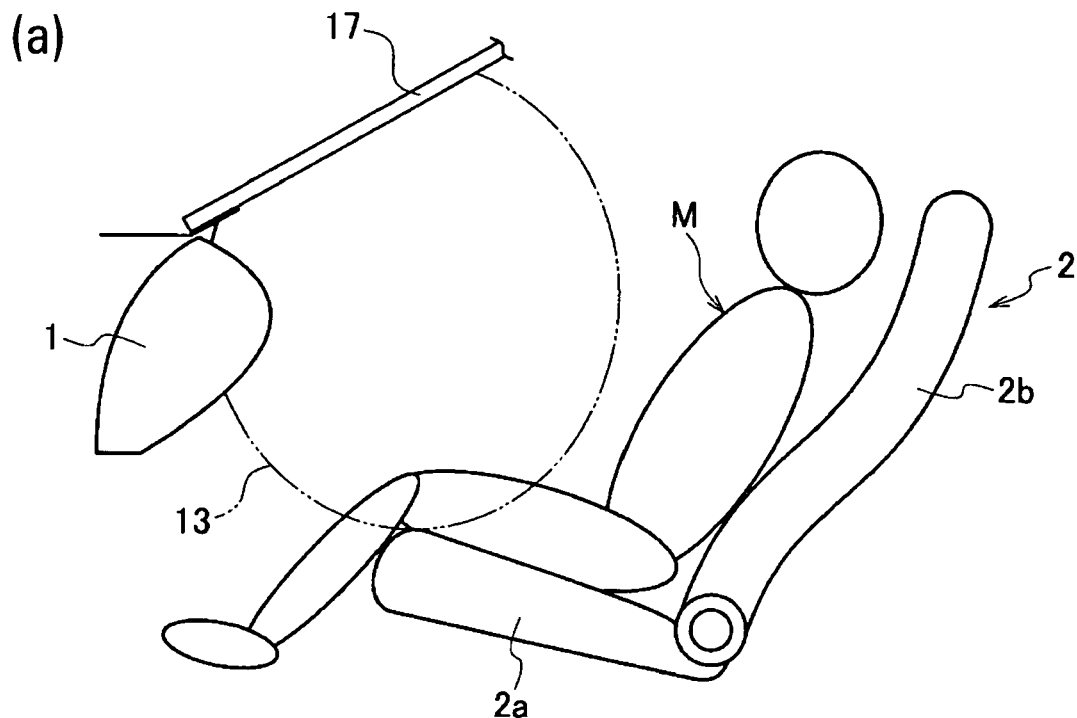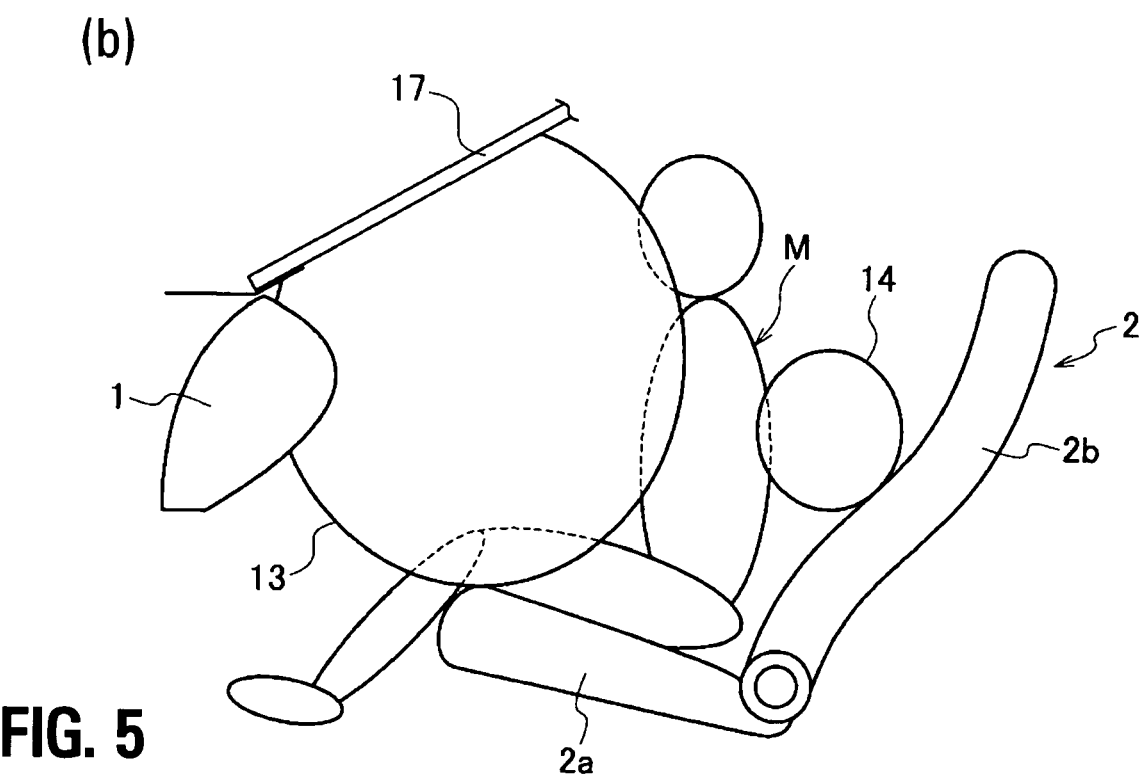
FIG. 5

US 7,607,511 B2

VEHICLE PASSENGER-RESTRAINING DEVICE AND METHOD

CROSS-REFERENCE

The present application claims priority under 35 U.S.C. § 119 of Japanese Patent Application No. 2005-198657, titled "VEHICLE PASSENGER-RESTRAINING DEVICE AND METHOD," filed on Jul. 7, 2005, the entire content of which is expressly incorporated by reference herein.

FIELD

The present invention pertains to a passenger-restraining device and method for a vehicle that restrains the passenger when the vehicle rolls over.

BACKGROUND

Technology already exists for a conventional passenger-restraining device in which airbags are housed in a folded state along the front header of the upper edge of the windshield and the front pillar of the side edge of the windshield so as to deploy above the passenger's head when the vehicle rolls over, e.g., unexamined Japanese Patent Application Publication No. H2003-63342 (Paragraph 3, FIG. 1). However, for such conventional passenger-restraining devices, since it was necessary to deploy the airbag up to the top of the passenger's head, the airbag typically needs to be increased in size, resulting in a very large-scale device of increased cost.

SUMMARY

For the present invention, a vehicle passenger-restraining device and method that can restrain the passenger when the vehicle rolls over without using a large-scale device is provided. One characteristic of the vehicle restraining device and method for the present invention is that the rollover of the vehicle is detected or predicted and in addition to a front airbag being deployed in front of the passenger, the passenger is also pushed forward. According to the vehicle passenger-restraining device for the present invention, the passenger is pushed forward when a vehicle rollover is detected or predicted, so the passenger can be pushed forward and held by the front airbag that has deployed allowing for restraint of the passenger without the use of a large-scale device and suppression of the movement of the passenger from the seat.

BRIEF DESCRIPTION OF THE DRAWINGS

FIG. 4 is a side view of an operating status, (a) and (b), for the passenger-restraining device when the passenger is in the first seating condition, according to another embodiment of the invention.

FIG. 5 is a side view of the operating status, (a) and (b), for the passenger-restraining device when the passenger is in the second seating condition, according to another embodiment of the invention.

DETAILED DESCRIPTION

Next is provided a detailed explanation of an embodiment of the present invention with reference to the drawings.

Figure 1:
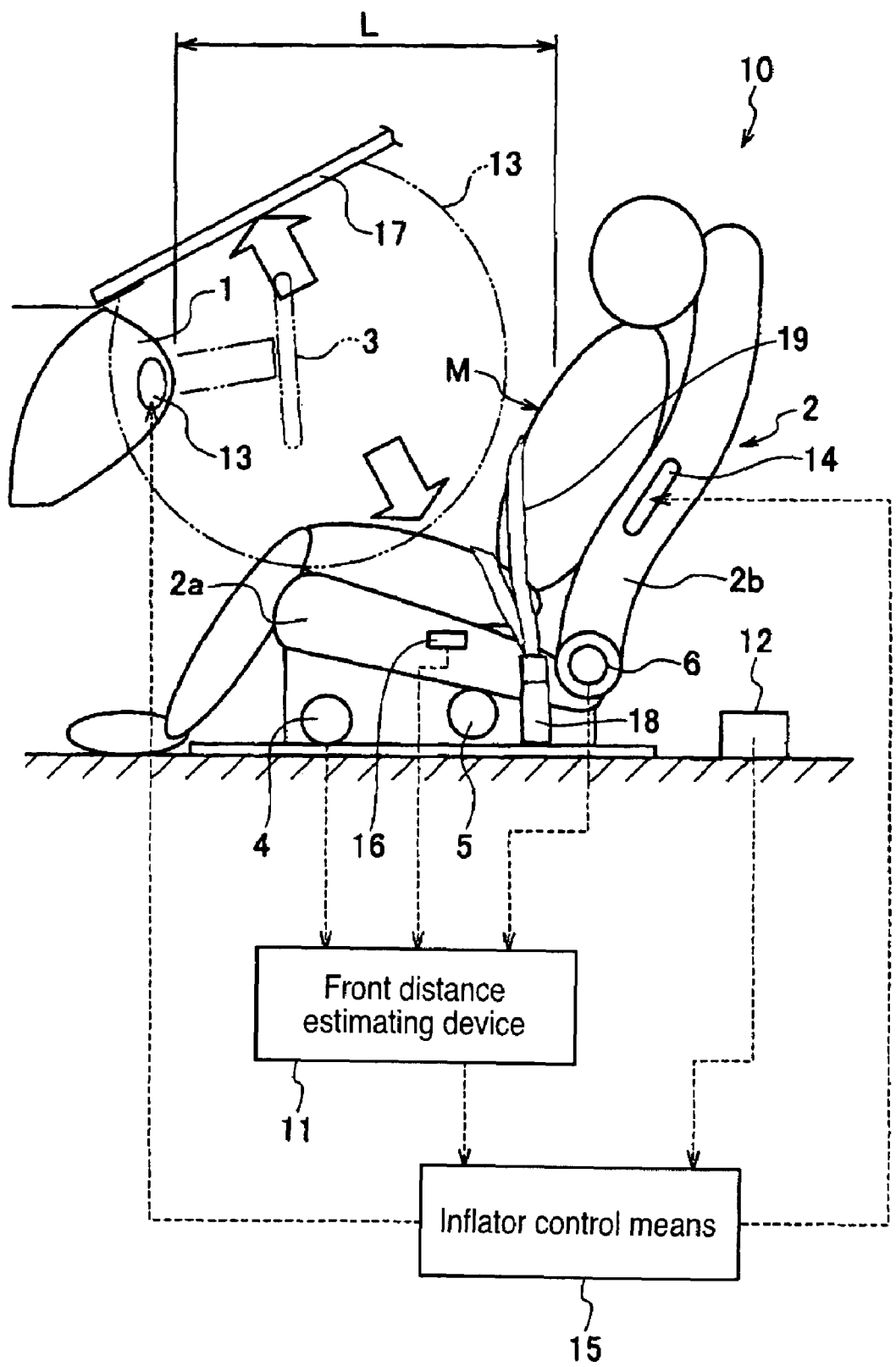
FIG. 1 is a side view of a passenger-restraining device, according to an embodiment of the invention.
Figure 2:
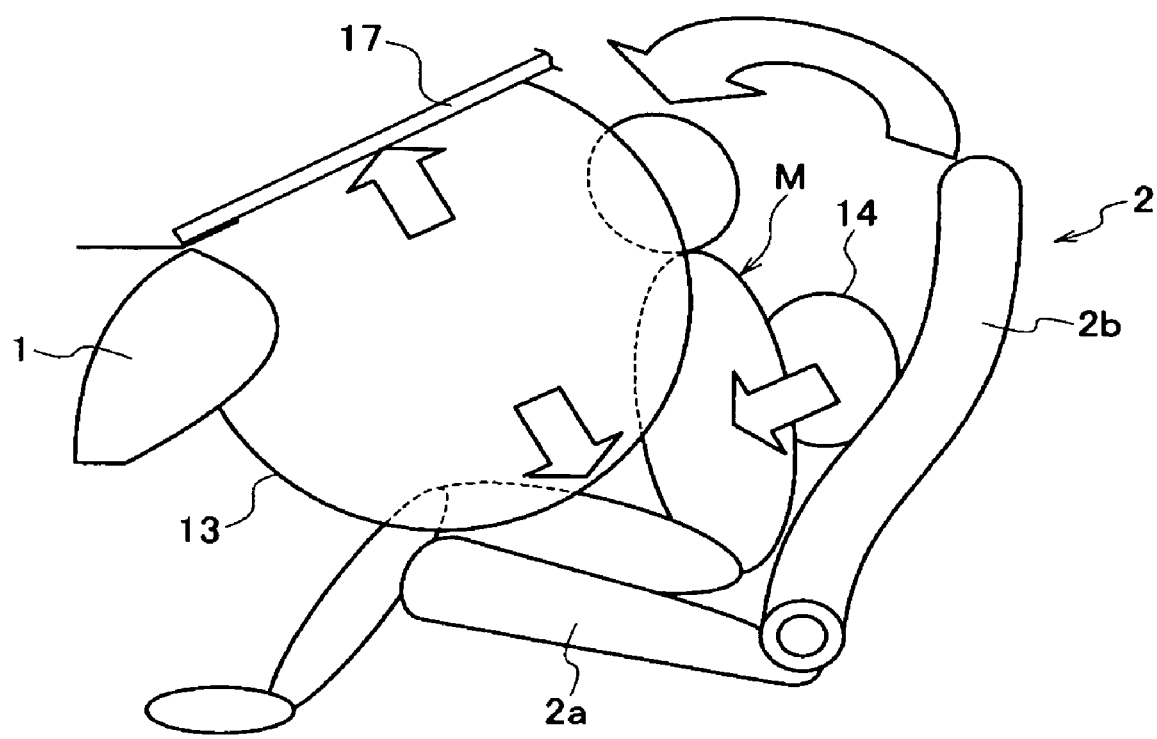
FIG. 2 is a side view showing a operating state of the passenger-restraining device, according to another embodiment of the invention.
Figure 3:
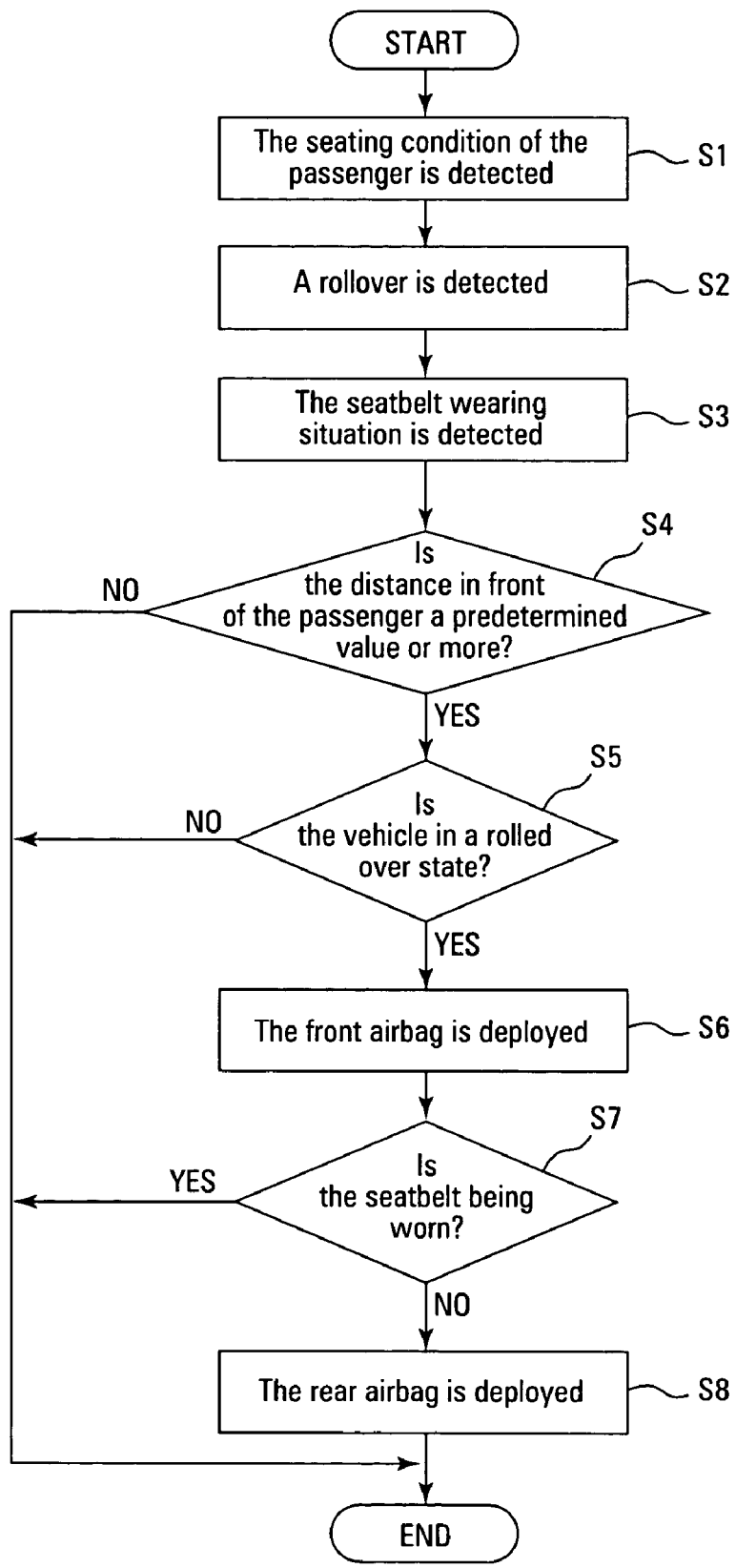
FIG. 3 is a explanatory diagram showing a flowchart of a control process for operating the passenger-restraining device, according to another embodiment of the invention.
Figure 6:
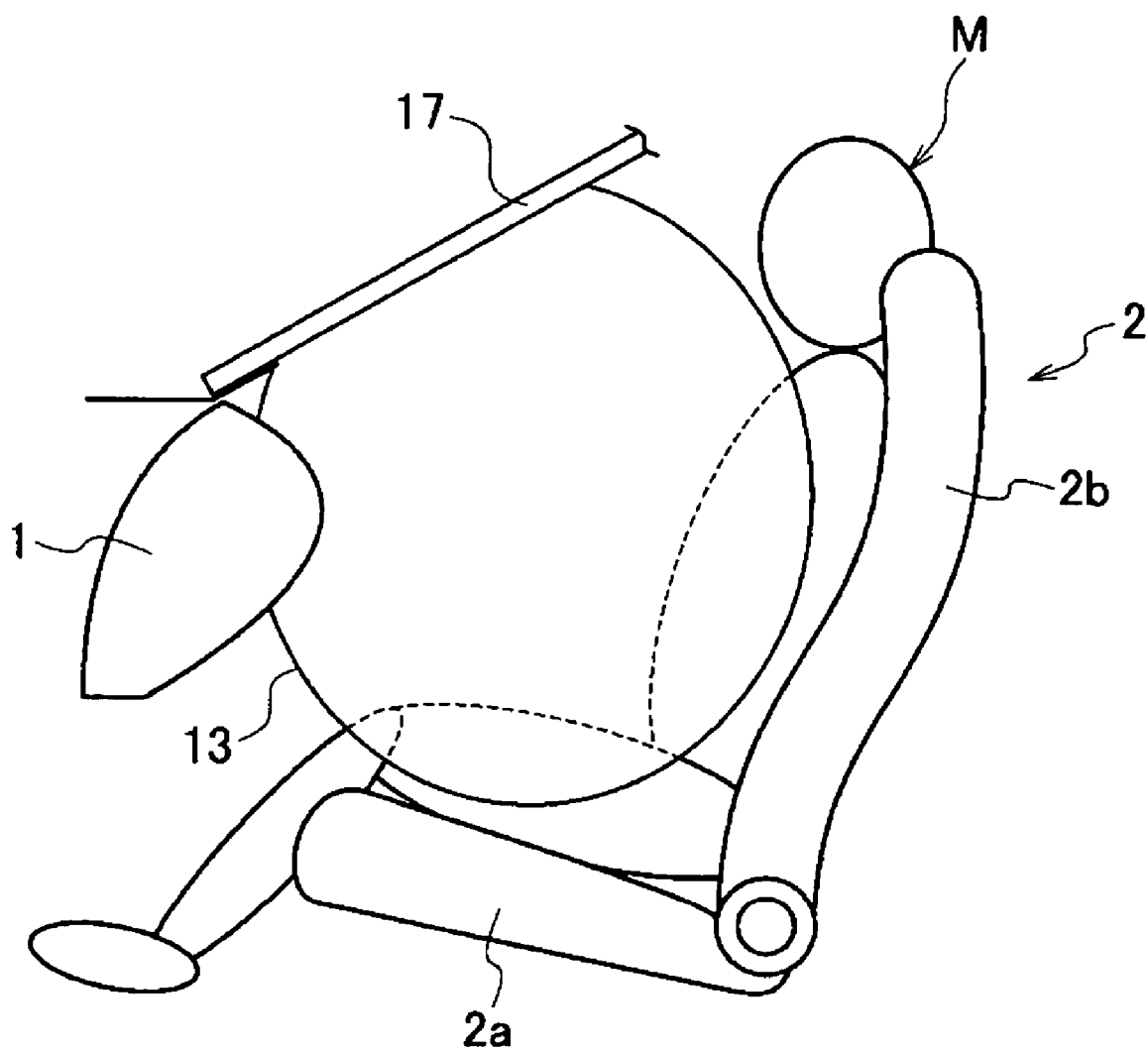
FIG. 6 is a side view of the operating status for the passenger-restraining device when the passenger is in the third seating condition, according to another embodiment of the invention.

FIGS. 1-6 show an embodiment of a vehicle passenger-restraining device, according to an embodiment of the invention. FIG. 1 is a side view of the passenger-restraining device pertaining to the present invention; FIG. 2 is a side view of the operating state of the passenger-restraining device; FIG. 3 is an explanatory diagram showing a flowchart for the control process for operating the passenger-restraining device; FIG. 4 is a side view of the operating status, (a) and (b), for the passenger-restraining device when the passenger is in the first seating condition; FIG. 5 is a side view of the operating status, (a) and (b), for the passenger-restraining device when the passenger is in the second seating condition; and FIG. 6 is a side view of the operating status for the passenger-restraining device when the passenger is in the third seating condition.

The vehicle passenger-restraining device 10 for the present embodiment is applied to front seat 2. Front seat 2 includes of the driver's seat and the passenger's seat that are disposed so as to face instrument panel 1, positioned at the front portion of the inside of the vehicle, as shown in FIG. 1. The restraining device detects the seating condition of passenger M. When the vehicle body side member that is positioned in front of passenger M while in the passenger seat, the restraining device is instrument panel 1. When the vehicle body side member that is positioned in front of passenger M while in the driver's seat, the restraining device is steering wheel 3. For one embodiment, the restraining device includes front distance estimating device 11 for estimating the distance L in front of the passenger that is between vehicle body side members 1 and 3. The restraining also includes device roll sensor 12, which is the rollover detection device for detecting the rollover of the vehicle body. The restraining device further includes front airbag 13 that deploys in front of passenger M when the vehicle body rolls over and rear airbag 14, which acts as a pushing device for pushing the passenger forward. Rear airbag 14, along with the deployment of said front airbag 13, push passenger M forward, while the passenger is held in a seated position in relation to seat cushion 2a, when it is estimated that the distance L in front of the passenger is a predetermined value or more and it is determined that the vehicle body has rolled over.

For one embodiment, front airbag 13 is deployed in front of passenger M, and the passenger is pushed forward so as to be held in a seated position in relation to the seat cushion when the distance that is between the distance L in front of passenger M and the vehicle body side member that is positioned in front of passenger M, which is instrument panel 1 or steering wheel 3, is a predetermined value or more.

Front seat 2 is equipped with seat cushion 2a, which is installed on the vehicle body floor via the seat slider and the seat lifter, and seatback 2b, which is attached at the rear end of seat cushion 2a by means of a reclining mechanism so that it can tilt back and forth freely. In addition, for one embodiment an ordinary driver's airbag, housed in steering wheel 3, or an ordinary passenger's airbag, housed in the glove box portion of instrument panel 1, can be used for front airbag 13.

The seat slider slides seat cushion 2a back and forth by means of seat slider drive device 4; the seat lifter raises seat cushion 2a by means of seat lifter drive device 5; and the reclining mechanism tilts seatback 2b back and forth by means of reclining drive device 6. Seat slider drive device 4, seat lifter drive device 5, and reclining drive device 6 are each provided with a sensor that detects their respective drive amounts in order to obtain information pertaining to the seat slide position, seat lifter position, and reclining angle.

Rear airbag 14 is housed in the portion of seatback 2b that corresponds with the upper body of passenger M, and by deploying said rear airbag 14 between seatback 2b and the upper body of passenger M, passenger M is bent forward as shown in FIG. 2.

Deployment of front airbag 13 and rear airbag 14 is controlled by inflator control means 15. Inflator control means 15 receives the signal from front distance estimating device 11 that estimated that the distance L in front of the passenger was a predetermined value or more and the rollover signal detected by roll sensor 12. Inflator control means 15 operates inflators (not shown) that are provided separately for each of front airbag 13 and rear airbag 14 and deploys each of airbags 13 and 14. Front distance estimating device 11 detects the seating condition of passenger M from the information pertaining to the body weight of passenger M, the seat slide position, and the reclining angle of seatback 2b. The body weight of passenger M is detected by load sensor 16 provided on seat cushion 2a, the seat slide position is detected by a sensor provided on seat slider drive device 4, and the reclining angle is detected by a sensor provided on reclining drive device 6.

As shown in the flowchart in FIG. 3, once the deployment control of aforementioned front airbag 13 and rear airbag 14, performed by inflator control means 15, is started by turning the ignition switch ON, the seating condition of the passenger is detected at Step S1, the vehicle rollover is detected at Step S2, and the seatbelt wearing situation of seatbelt 19 is detected by seatbelt wearing detection device 18. Then, at Step S4, it is determined whether or not the distance L in front of the passenger is a predetermined value or more, and if it is a predetermined value or more (YES), the process proceeds to Step S5 where it is determined whether or not the vehicle is in a rolled over state, and if it is in a rolled over state (YES), front airbag 13 is deployed at Step S6. After front airbag 13 has been deployed, if it is determined that seatbelt 19 is not being worn (NO) at Step S7, rear airbag 14 is deployed at Step S8.

If it is determined at Step S4 that the distance L in front of the passenger is less than the predetermined value (NO), the control process is ended. If it is determined at Step S5 that the vehicle is not in the rolled over state (NO), the control process is ended. If it is determined at Step S7 that seatbelt 19 is being worn (YES), the control process is ended. For one embodiment, the process in the flowchart is repeatedly performed for predetermined short increments of time until the ignition is OFF in order to manage the deployment control of aforementioned front airbag 13 and rear airbag 14.

Figure 7:
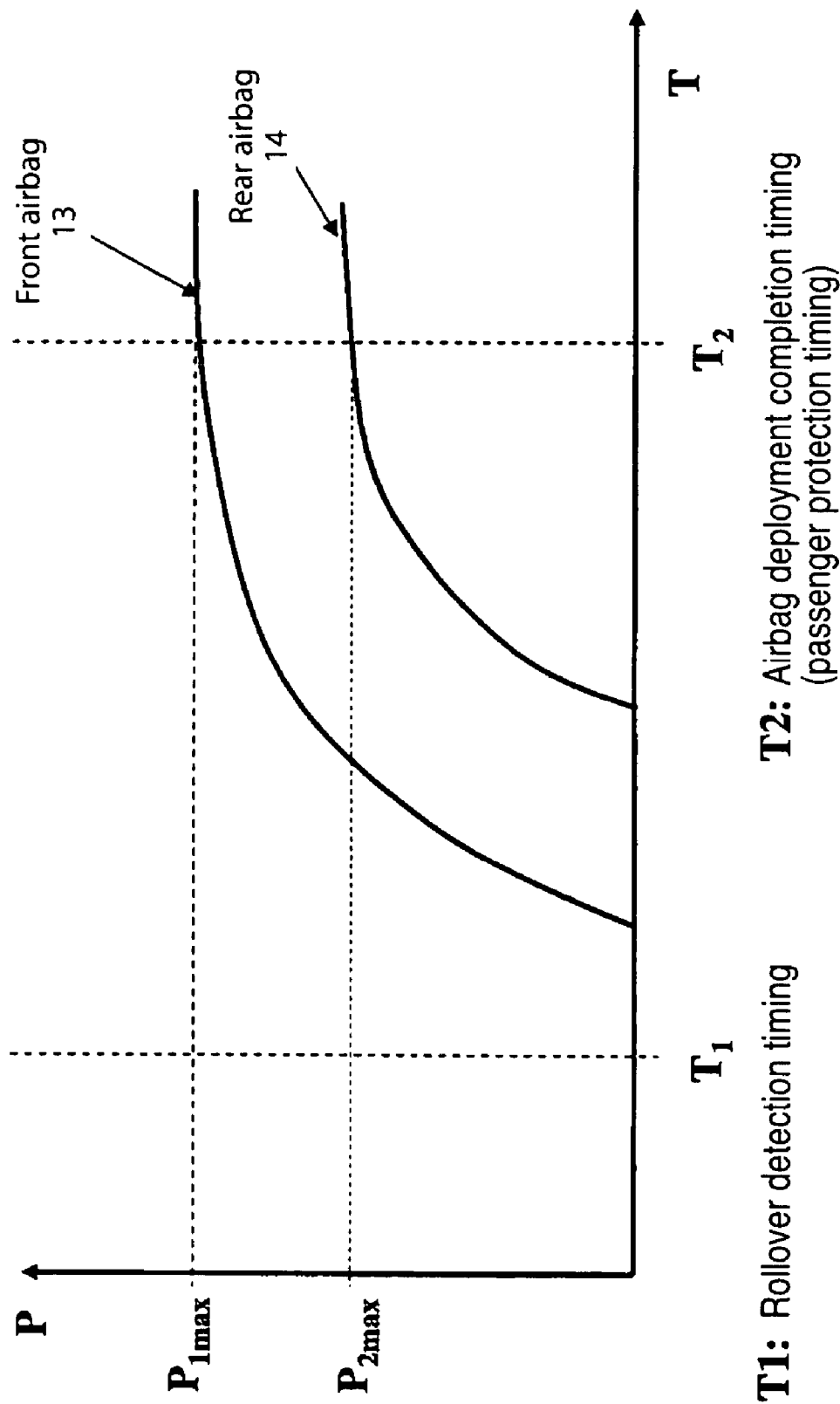
FIG. 7 is an explanatory diagram showing the timing in which the airbag deploys, according to another embodiment of the invention.

Furthermore, when referring to FIG. 7, it can be seen that for one embodiment a larger capacity airbag may be used for front airbag 13 than for rear airbag 14 so that the deployment of front airbag 13 begins first after a rollover is detected (rollover detection timing T1), and deployment of rear airbag 14 begins after a predetermined amount of time has elapsed. After this takes place, the time in which front airbag 13 reaches the maximum internal pressure P1MAX, and the time in which rear airbag 14 reaches the maximum internal pressure P2MAX, are set to be approximately the same (deployment completion timing T2). In this manner, passenger M can be firmly pushed against front airbag 13.

In addition, the internal pressure of both front airbag 13 and rear airbag 14 drops after the maximum internal pressures P1MAX and P2MAX have been maintained for a few seconds. In this manner, as shown in FIG. 4 (*a*), for the first seating condition of the passenger, where the physical size of passenger M is small (e.g., less than about 60 kilograms), the seat slide position is in the middle, the reclining angle is small (e.g., about 21 degrees from the vertical or less), and a seatbelt is not being worn, or for the second seating condition as shown in FIG. 5 (*a*), where the physical size of passenger M is average (e.g., about 60 kilograms to about 85 kilograms), the seat slide position is to the rear, the reclining angle is large (e.g., greater than about 21 degrees from the vertical), and a seatbelt is not being worn, restraining device 10, in which front airbag 13 and rear airbag 14 are controlled, provides distance between passenger M and deployed front airbag 13 so that rear airbag 14 is operated (deployed) in either situation as shown in FIG. 4 (*b*) and FIG. 5 (*b*). On the other hand, for the third seating condition, where the physical size of passenger M is large (e.g., greater than about 85 kilograms), the seat slide position is forward, and the reclining angle is small, as shown in FIG. 6, since the physical size of passenger M is large and the seat slide position is toward the front, passenger M can be sufficiently restrained between deployed front airbag 13 and seatback 2b, so rear airbag 14 is not operated. For the third seating condition shown in FIG. 6, seatbelt 19 can either be worn or not worn.

According to the embodiment of passenger-restraining device 10 that has the aforementioned constitution, when the distance L in front of the passenger is a predetermined value or more and when the vehicle body rolls over, rear airbag 14 is deployed so as to bend and push passenger M forward, so the passenger can be pushed and held in place by front airbag 13, and the movement of the passenger from the seat can be prevented. Furthermore, since passenger M can be restrained by sandwiching the passenger between front airbag 13, which has deployed due to the detection of a rollover, and rear airbag 14, which is supported by aforementioned seatback 2b, passenger M can be prevented from moving from front seat 2, even when not wearing seatbelt 19. Then, by pushing passenger M forward while maintaining the seated position in relation to seat cushion 2a when a rollover takes place, the objective of restraining passenger M can be met, and passenger-restraining device 10 can be simplified.

The device that pushes the passenger forward for the present embodiment comprises rear airbag 14 that deploys between the upper body of passenger M and seatback 2b, so the upper body of passenger M can be bent forward by deploying aforementioned rear airbag 14, and passenger M can be firmly pushed forward and restrained between rear airbag 14 and front airbag 13. In this manner, by constructing the device for pushing the passenger forward with rear airbag 14, and simply adding this rear airbag 14 to seatback 2b in addition to front airbag 13, which is normally installed for front-end collisions, passenger-restraining device 10 can be simplified, resulting in a more compact device and a lower system cost. Furthermore, by deploying aforementioned rear airbag 14, passenger M can be bent in the forward direction, resulting in an increase in the space above passenger M's head when a rollover takes place and a decrease in the interference with the ceiling surface.

Front distance estimating device 11 detects the seating condition of passenger M based on the information for the body weight of passenger M, the seat slide position and the reclining angle of seatback 2b in order to estimate the distance L in front of the passenger, thus allowing for accurate detection of the seating condition of passenger M and a more precise estimation of the distance L in front of the passenger, consequently improving the restraining effectiveness of passenger M by passenger-restraining device 10.

Rear airbag 14 operates for both the first seating condition in which the physical size of passenger M is small, the seat slide position is in the middle, the reclining angle is small, and a seatbelt is not being worn and the second seating condition in which the physical size of passenger M is average, the seat slide position is to the rear, the reclining angle is large, and a seatbelt is not being worn. Therefore, when a female passenger with a small physical size, who is not wearing seatbelt 19, is seated unrestrained (the first seating condition) or when an adult male passenger with an average physical size, who is not wearing a seatbelt, is seated unrestrained (the second seating condition), and the vehicle body rolls over, passenger M can be firmly restrained between front airbag 13 and rear airbag 14, which is supported by seat cushion 2b. For the third seating condition in which the physical size of the passenger is large, the seat slide position is to the front, and the reclining angle is small, the rear airbag does not operate. Therefore, when an adult male with a large physical size is seated in a forward position that is relatively cramped and a rollover takes place, rear airbag 14 does not deploy, and passenger M can be restrained by means of front airbag 13 between said airbag 13 and seatback 2b only.

Figure 8:
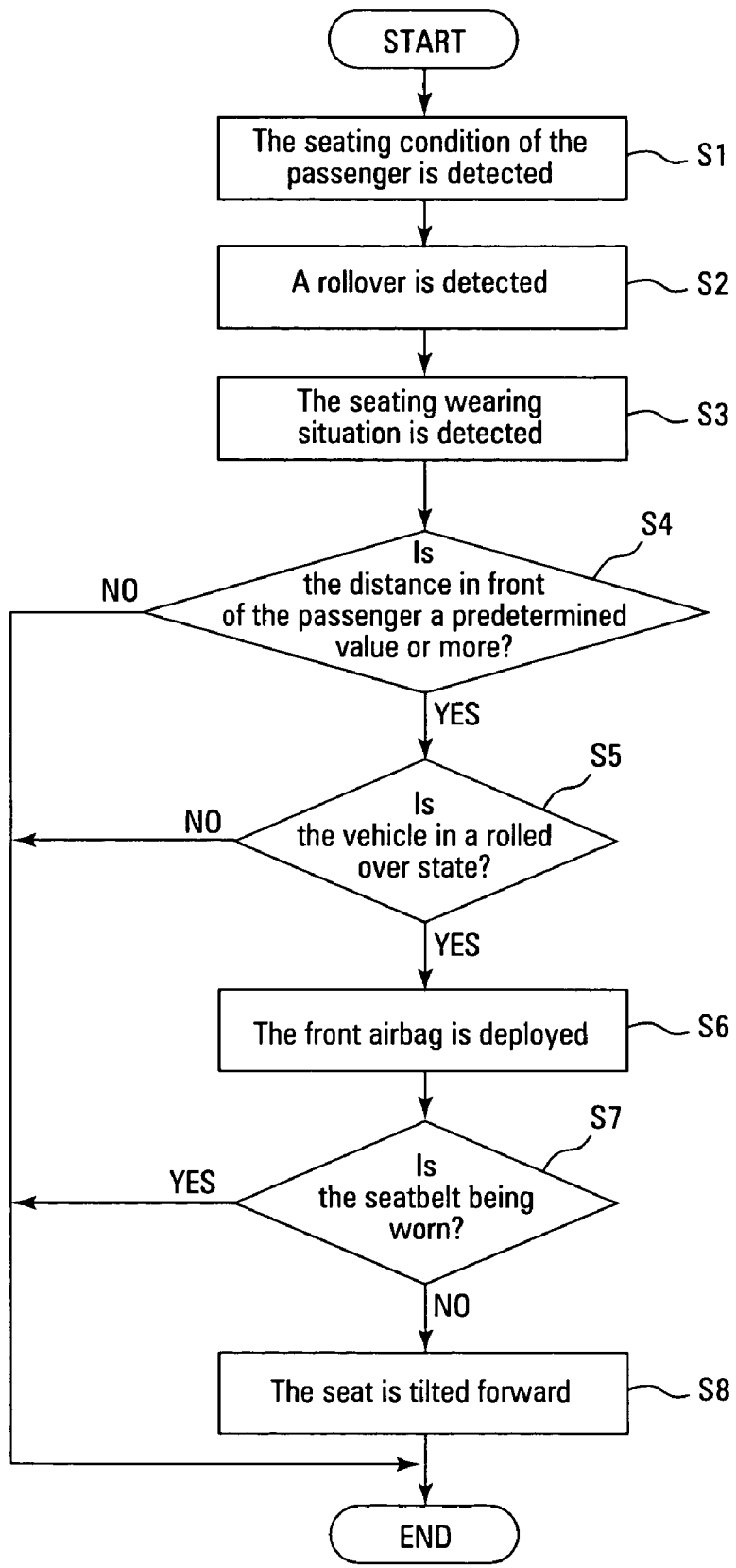
FIG. 8 is an explanatory diagram showing a flowchart of a control process for operating the passenger-restraining device, according to another embodiment of the invention.
Figure 9:
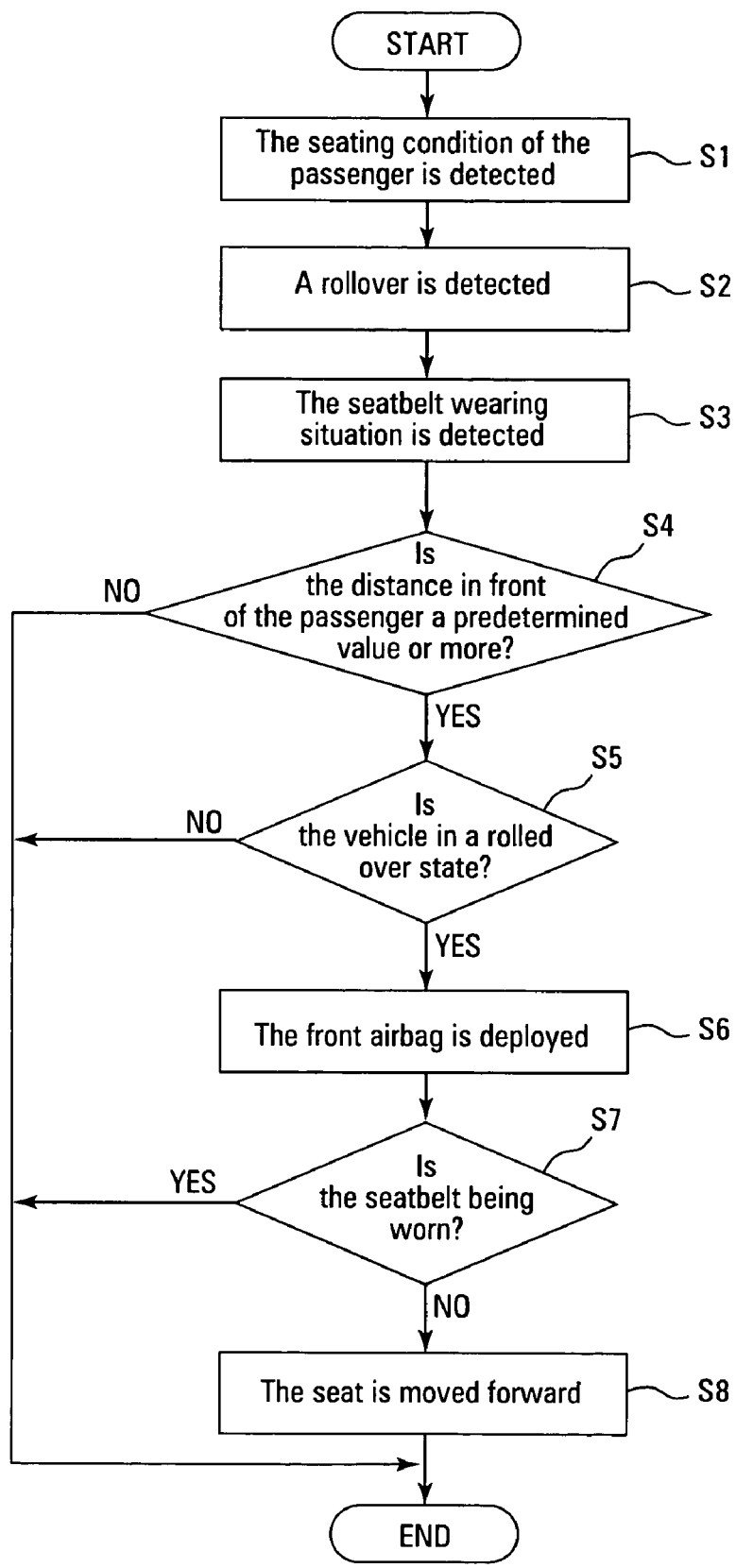
FIG. 9 is an explanatory diagram showing a flowchart of a control process for operating the passenger-restraining device, according to another embodiment of the invention.

Although the present invention was explained using the aforementioned embodiment as an example, the present invention is not restricted to this embodiment and various other types of embodiments may be used as long as they do not deviate from the gist of the present invention. Therefore, although the device for pushing the passenger forward was constituted with rear airbag 14, reclining drive device 6 that tilts seatback 2b forward or seat slide drive device 4 that moves seat 2 forward could also be used (refer to FIGS. 8 and 9), so the present invention could be constituted with at least one of rear airbag 14, reclining drive device 6, and seat slide drive device 4. When reclining drive device 6 or seat slide drive device 4 are used, since these devices 6 and 4 are already-existing technology, the constitution of passenger-restraining device 10 can be simplified and the device can be offered at a lower cost.

Figure 10:
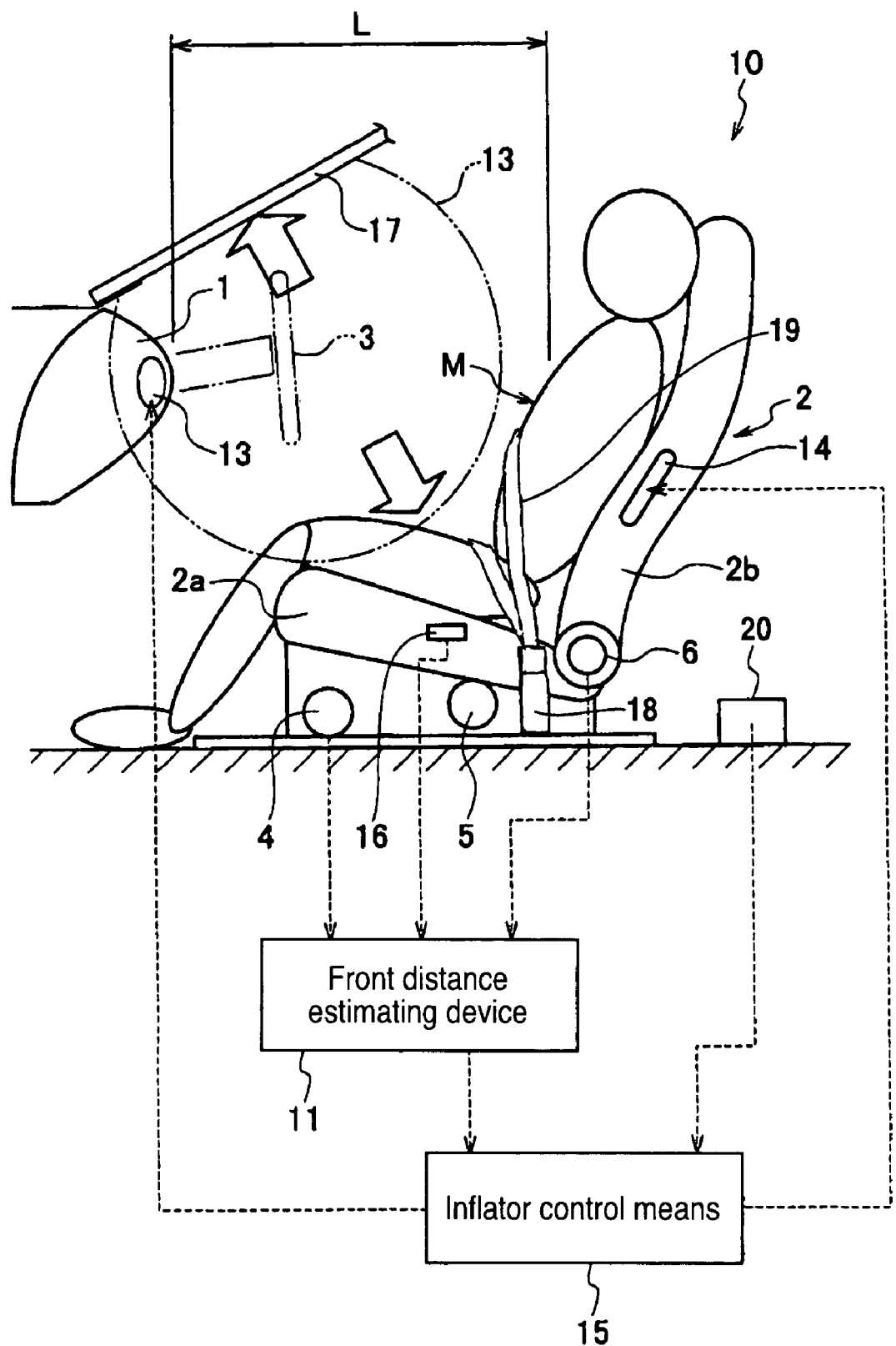
FIG. 10 is a side view of the passenger-restraining device, according to another embodiment of the invention.
Figure 11:
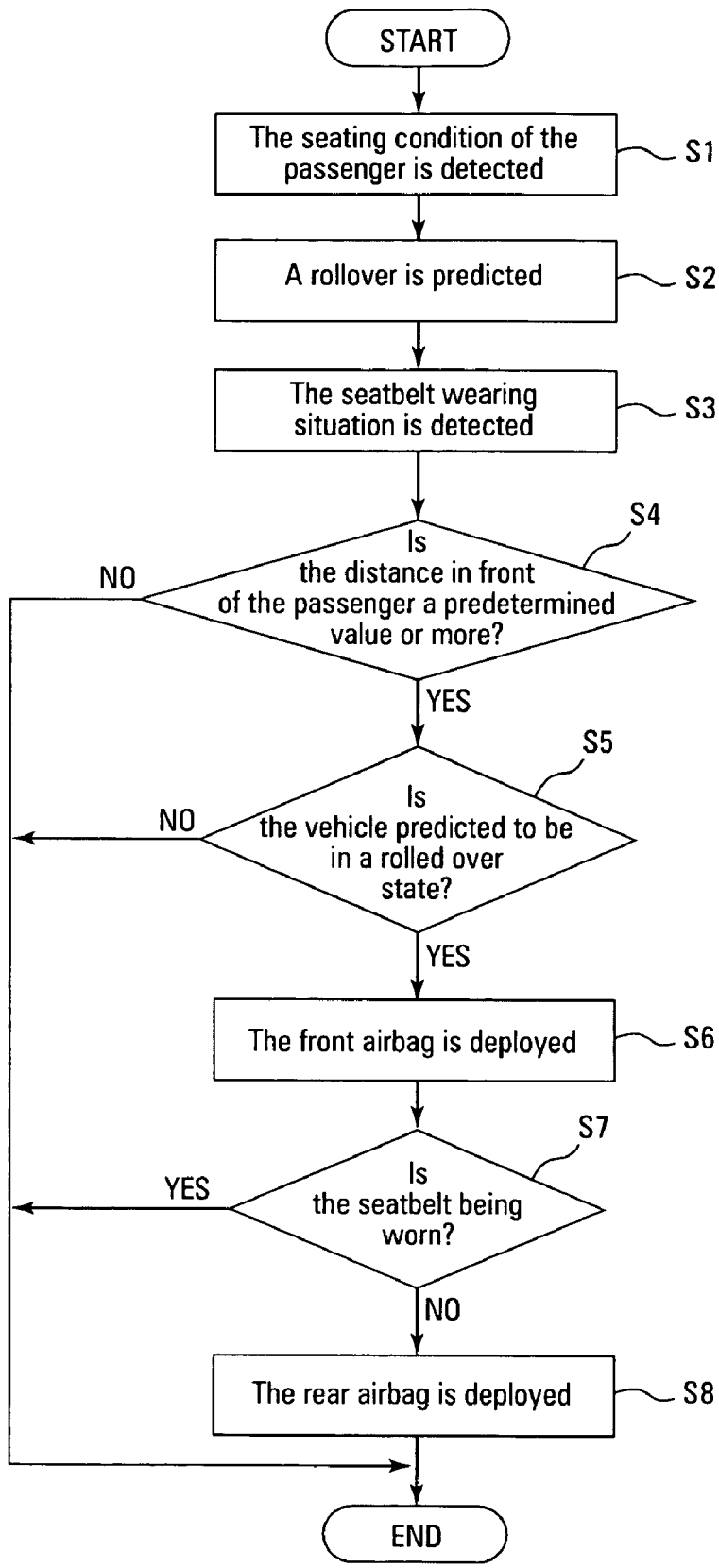
FIG. 11 is an explanatory diagram showing a flowchart of a control process for operating the passenger-restraining device, according to another embodiment of the invention.

Front distance estimating device 11 was constituted to detect the seating condition of passenger M by inputting the information for the body weight of passenger M, the seat slide position and the reclining angle of the seatback, but the body weight, seat slide position, and reclining angle need not all be used, and the seating condition can be detected based on information for one of these. Furthermore, sensor 12 was used to detect the vehicle body rollover, but the rollover state of the vehicle body could also be detected by integrating the output value from side impact G sensor 20 and determining the rollover based on the point at which this integrated value reaches a predetermined value or more (FIG. 10). Or, as shown in FIG. 11, a rollover could be predicted based on the output value from the side impact G sensor 20 or roll sensor 12, and the pushing timing of the passenger-restraining device could be accelerated.

What is claimed is:

1. A vehicle passenger-restraining device, comprising:
   a rollover detection device that detects or predicts a rollover of the vehicle;
   a front airbag that deploys in front of the passenger when the rollover detection device detects or predicts the rollover of the vehicle; and
   a pushing device that starts to push the passenger forward against the deployed front airbag so that the passenger is held by the deployed front airbag after the front airbag starts to deploy when the rollover detection device detects or predicts the rollover of the vehicle.

2. The vehicle passenger-restraining device of claim 1, further comprising
   a front distance estimating means for estimating a distance in front of the passenger that is between the passenger and a side member of the vehicle that is positioned to the front of the passenger, wherein
   the pushing device pushes the passenger forward when the front distance estimating device estimates that the distance in front of the passenger is a predetermined value or more.

3. The vehicle passenger-restraining device of claim 2, wherein
   the distance in front of the passenger is detected using information pertaining to a seating condition of the passenger.

4. The vehicle passenger-restraining device of claim 3, wherein
   the information pertaining to the seating condition comprises a body weight of the passenger.

5. The vehicle passenger-restraining device of claim 3, wherein
   the information pertaining to the seating condition comprises a seat slide position.

6. The vehicle passenger-restraining device of claim 3, wherein
   the information pertaining to the seating condition comprises a seatback reclining angle.

7. The vehicle passenger-restraining device of claim 1, further comprising
   a seatbelt wearing detection device that detects whether a seatbelt is worn by the passenger, wherein
   the pushing device pushes the passenger forward when the seatbelt wearing detection device detects that the seatbelt is not being worn.

8. The vehicle passenger-restraining device of claim 1, wherein
   the pushing device that pushes the passenger forward is a rear airbag that deploys between an upper body of the passenger and a seatback of a seat in which the passenger is seated.

9. The vehicle passenger-restraining device of claim 1, wherein
   the pushing device that pushes the passenger forward is a reclining drive device that tilts a seatback of a seat in which the passenger is seated forward.

10. The vehicle passenger-restraining device of claim 1, wherein
    the pushing device that pushes the passenger forward is a seat slide drive device that moves a seat in which the passenger is seated forward.

11. A vehicle passenger-restraining device, comprising:
a rollover detection device that detects or predicts a rollover of the vehicle;
a front airbag that deploys in front of the passenger when the rollover detection device detects or predicts the rollover of the vehicle; and
a pushing device that pushes the passenger forward against the deployed front airbag so that the passenger is held by the deployed front airbag when the rollover detection device detects or predicts the rollover of the vehicle,
the pushing device that pushes the passenger forward operating under a seating condition comprising a physical size of the passenger being relatively small, a seat slide position being at a middle location, a seatback reclining angle being relatively small, and a seatbelt not being worn.

12. A vehicle passenger-restraining device, comprising:
a rollover detection device that detects or predicts a rollover of the vehicle;
a front airbag that deploys in front of the passenger when the rollover detection device detects or predicts the rollover of the vehicle; and
a pushing device that pushes the passenger forward against the deployed front airbag so that the passenger is held by the deployed front airbag when the rollover detection device detects or predicts the rollover of the vehicle,
the pushing device that pushes the passenger forward operating under a seating condition comprising a physical size of the passenger being relatively average, a seat slide position being at a rear location, a seatback reclining angle being relatively large, and a seatbelt not being worn.

13. A vehicle passenger-restraining device, comprising:
a rollover detection device that detects or predicts a rollover of the vehicle;
a front airbag that deploys in front of the passenger when the rollover detection device detects or predicts the rollover of the vehicle; and
a pushing device that pushes the passenger forward against the deployed front airbag so that the passenger is held by the deployed front airbag when the rollover detection device detects or predicts the rollover of the vehicle,
the pushing device that pushes the passenger forward not operating under a seating condition comprising a physical size of the passenger being relatively large, a seat slide position being at a front location, and a seatback reclining angle being relatively small.

14. A vehicle passenger-restraining device, comprising:
a rollover detection device that detects or predicts a rollover of the vehicle;
a front airbag that deploys in front of the passenger when the rollover detection device detects or predicts the rollover of the vehicle; and
a pushing device that pushes the passenger forward against the deployed front airbag so that the passenger is held by the deployed front airbag when the rollover detection device detects or predicts the rollover of the vehicle,
the pushing device that pushes the passenger forward being a rear airbag that deploys between an upper body of the passenger and a seatback of a seat in which the passenger is seated,
deployment of the rear airbag being started after a predetermined amount of time has elapsed after the deployment of the front airbag has begun.

15. A vehicle passenger-restraining device, comprising:
a rollover detection device that detects or predicts a rollover of the vehicle;
a front airbag that deploys in front of the passenger when the rollover detection device detects or predicts the rollover of the vehicle; and
a pushing device that pushes the passenger forward against the deployed front airbag so that the passenger is held by the deployed front airbag when the rollover detection device detects or predicts the rollover of the vehicle,
the pushing device that pushes the passenger forward being a rear airbag that deploys between an upper body of the passenger and a seatback of a seat in which the passenger is seated,
a timing in which the aforementioned front airbag reaches a maximum internal pressure and a timing in which the rear airbag reaches the maximum internal pressure being set to be approximately the same timing.

16. The vehicle passenger-restraining device of claim 15, wherein
the front airbag and rear airbag are both maintained at the state of maximum internal pressure for a predetermined period of time.

17. A vehicle passenger-restraining device, comprising:
a rollover detection means that detects or predicts a rollover of the vehicle;
a front airbag means that deploys in front of the passenger when the rollover detection means detects or predicts the rollover of the vehicle; and
a moving means that starts to push the passenger forward against the deployed front airbag means so that the passenger is held by the deployed front airbag means after the front airbag means starts to deploy when the rollover detection means detects or predicts the rollover of the vehicle.

18. A vehicle passenger-restraining device, comprising:
means for detecting or predicting a rollover of the vehicle;
means for deploying a front airbag in front of the passenger upon detecting or predicting the rollover of the vehicle;
means for holding a lower portion of the passenger against a seat in response to detecting or predicting the rollover of the vehicle; and
means for starting to push an upper portion of the passenger forward, away from a seatback and in direction towards the deployed front airbag such that the passenger is held by the deployed front airbag, in response to starting to deploying the front airbag upon detecting or predicting the rollover of the vehicle.

19. The vehicle passenger-restraining device of claim 18, further comprising
means for estimating a distance in front of the passenger that is between the passenger and a side member of the vehicle that is positioned to the front of the passenger.

20. The vehicle passenger-restraining device of claim 18, further comprising at least
means for detecting a body weight of the passenger.

21. The vehicle passenger-restraining device of claim 18, further comprising at least
means for detecting a seat slide position.

22. The vehicle passenger-restraining device of claim 18, further comprising at least
means for detecting a reclining angle of the seatback.

23. A vehicle passenger-restraining method, comprising:
detecting or predicting a rollover of the vehicle;
deploying a front airbag that deploys in front of a passenger in response to detecting or predicting the rollover of the vehicle;
holding a lower portion of the passenger against a seat in response to detecting or predicting the rollover of the vehicle; and pushing an upper portion of the passenger forward, away from a seatback, and against the front airbag so that the passenger is held against the front airbag, with the pushing of the upper portion of the passenger starting in response to starting to deploy the front airbag upon detecting or predicting the rollover of the vehicle.

24. The method of claim 23, further comprising estimating a distance in front of the passenger that is between the passenger and a side member of the vehicle that is positioned to the front of the passenger in response to detecting or predicting the rollover of the vehicle, wherein the upper portion of the passenger is pushed forward when the distance in front of the passenger is a predetermined value or more.

25. The method of claim 23, further comprising detecting whether the passenger is wearing a seatbelt in response to detecting or predicting the rollover of the vehicle, wherein the upper portion of the passenger is pushed forward when the passenger is not wearing a seatbelt.

26. The method of claim 23, further comprising, in response to detecting or predicting the rollover of the vehicle, detecting at least a body weight of the passenger.

27. The method of claim 23, further comprising, in response to detecting or predicting the rollover of the vehicle, detecting at least a seat slide position.

28. The method of claim 23, further comprising, in response to detecting or predicting the rollover of the vehicle, detecting at least a reclining angle of the seatback.

29. A vehicle passenger-restraining method, comprising:

detecting or predicting a rollover of the vehicle;

deploying a front airbag that deploys in front of a passenger in response to detecting or predicting the rollover of the vehicle;

holding a lower portion of the passenger against a seat in response to detecting or predicting the rollover of the vehicle; and pushing an upper portion of the passenger forward, away from a seatback, and against the front airbag so that the passenger is held against the front airbag, in response to detecting or predicting the rollover of the vehicle, the pushing of the upper portion of the passenger forward occuring when a physical size of the passenger is relatively small, a seat slide position is at a middle location, a seatback reclining angle is relatively small, and a seatbelt is not being worn or the physical size of the passenger is relatively average, the seat slide position is at a rear location, the seatback reclining angle is relatively large, and a seatbelt is not being worn.

* * * * *